US009326062B2

(12) United States Patent
Cilia

(10) Patent No.: US 9,326,062 B2
(45) Date of Patent: Apr. 26, 2016

(54) METHOD AND SYSTEM OF EXTENDING BATTERY LIFE OF A WIRELESS MICROPHONE UNIT

(71) Applicant: Enforcement Video, LLC, Allen, TX (US)

(72) Inventor: Andrew Cilia, McKinney, TX (US)

(73) Assignee: Enforcemet Video, LLC, Allen, TX (US)

( * ) Notice: Subject to any disclaimer, the term of this patent is extended or adjusted under 35 U.S.C. 154(b) by 178 days.

(21) Appl. No.: 14/224,100

(22) Filed: Mar. 25, 2014

(65) Prior Publication Data

US 2014/0205112 A1    Jul. 24, 2014

Related U.S. Application Data

(63) Continuation of application No. 12/509,939, filed on Jul. 27, 2009, now Pat. No. 8,712,362.

(60) Provisional application No. 61/083,919, filed on Jul. 26, 2008.

(51) Int. Cl.
| H04B 1/16 | (2006.01) |
| H04R 3/00 | (2006.01) |
| G10L 19/012 | (2013.01) |
| H04M 1/60 | (2006.01) |

(52) U.S. Cl.
CPC ............... *H04R 3/00* (2013.01); *G10L 19/012* (2013.01); *H04M 1/6058* (2013.01)

(58) Field of Classification Search
None
See application file for complete search history.

(56) References Cited

U.S. PATENT DOCUMENTS

| 4,658,425 | A | * | 4/1987 | Julstrom | ............... | H04M 3/569 |
| | | | | | | 379/206.01 |
| 5,220,565 | A | * | 6/1993 | Wilson | ................... | H03G 3/344 |
| | | | | | | 370/349 |
| 5,835,042 | A | * | 11/1998 | Ichimura | ................. | H04L 27/18 |
| | | | | | | 341/143 |
| 6,944,287 | B2 | | 9/2005 | Mori | | |
| 7,096,035 | B2 | | 8/2006 | Gouessant et al. | | |
| 7,119,832 | B2 | | 10/2006 | Blanco et al. | | |
| 8,712,362 | B2 | * | 4/2014 | Cilia | ..................... | G10L 19/012 |
| | | | | | | 455/343.1 |
| 2003/0045333 | A1 | | 3/2003 | Kimata et al. | | |
| 2007/0030351 | A1 | | 2/2007 | Blanco et al. | | |
| 2007/0031054 | A1 | * | 2/2007 | Shain | ..................... | H04N 19/93 |
| | | | | | | 382/250 |
| 2007/0037606 | A1 | * | 2/2007 | Ganley | ..................... | H04R 3/00 |
| | | | | | | 455/569.1 |
| 2010/0074449 | A1 | | 3/2010 | Tabata | | |

(Continued)

FOREIGN PATENT DOCUMENTS

KR    0613054 B1 *  8/2006  ............... H03G 3/30

*Primary Examiner* — Lana N Le
(74) *Attorney, Agent, or Firm* — Winstead PC

(57) ABSTRACT

A method of extending battery life of a wireless microphone unit includes muting the wireless microphone unit responsive to a mute signal from a base station unit, transmitting, by the wireless microphone unit, compressed muted audio data, wherein the compressed muted audio data is compressed via a first compression scheme, determining, by the wireless microphone unit, whether an unmute signal has been received from the base station unit, and responsive to a determination that the unmute signal has been received, unmuting the wireless microphone unit. The method further includes discontinuing transmission of the compressed muted audio data and transmitting compressed audio data via a second compression scheme, wherein the first transmitting step causes the wireless microphone unit to consume less power per unit of transmission time than the second transmitting step.

12 Claims, 4 Drawing Sheets

(56) References Cited

U.S. PATENT DOCUMENTS

| | | |
|---|---|---|
| 2010/0120366 A1 | 5/2010 | DeBiasio et al. |
| 2012/0230509 A1 | 9/2012 | Hagglund et al. |
| 2015/0036842 A1* | 2/2015 | Robinson ................ G06F 3/165 |
| | | 381/103 |
| 2015/0208156 A1* | 7/2015 | Virolainen .............. H04S 7/303 |
| | | 381/92 |

* cited by examiner

METHOD AND SYSTEM OF EXTENDING BATTERY LIFE OF A WIRELESS MICROPHONE UNIT

CROSS-REFERENCE TO RELATED APPLICATIONS

This application is a continuation of and claims priority from U.S. patent application Ser. No. 12/509,939, filed on Jul. 27, 2009. U.S. patent application Ser. No. 12/509,939 claims priority from U.S. Provisional Patent Application No. 61/083,919, filed on Jul. 26, 2008. U.S. patent application Ser. No. 12/509,939 and U.S. Provisional Patent Application No. 61/083,919 are incorporated herein by reference.

BACKGROUND

1. Technical Field

This patent application relates generally to microphones, and in particular, to systems and methods for extending battery life of a wireless microphone unit by incorporating data compression and muting of the microphone.

2. History Of Related Art

Wireless microphones are used in many fields of endeavor today. One typical application of wireless microphones is in law enforcement. A typical wireless microphone unit includes a microphone and a transmitter that is used to transmit signals representing sounds detected by the microphone. In a typical arrangement, a vehicle of a law-enforcement officer includes a base station that is operable to communicate wirelessly with the wireless microphone unit.

Because the wireless microphone unit is wireless, it is necessary for the wireless microphone unit to also include a battery. While battery technology has improved greatly in recent years, demands of transmission by the wireless microphone unit in combination with unpredictable shift lengths of law-enforcement officers can, in some circumstances, cause life of the battery incorporated into the wireless microphone unit to be exceeded.

SUMMARY OF THE INVENTION

A method of extending battery life of a wireless microphone unit. The method includes muting the wireless microphone unit responsive to a mute signal from a base station unit, transmitting, by the wireless microphone unit, compressed muted audio data, wherein the compressed muted audio data is compressed via a first compression scheme, determining, by the wireless microphone unit, whether an unmute signal has been received from the base station unit, and responsive to a determination that the unmute signal has been received, unmuting the wireless microphone unit. The method further includes discontinuing transmission of the compressed muted audio data and transmitting compressed audio data via a second compression scheme, wherein first transmitting step causes the wireless microphone unit to consume less power per unit of transmission time than the second transmitting step.

A method of extending battery life of a wireless microphone unit. The method includes muting the wireless microphone unit responsive to a mute signal from a base station unit and transmitting, by the wireless microphone unit, run-length-encoded muted audio data. The method further includes determining, by the wireless microphone unit, whether an unmute signal has been received from the base station unit and responsive to a determination that the unmute signal has been received, unmuting the wireless microphone unit.

An article of manufacture for extending battery life of a wireless microphone unit, the article of manufacture includes at least one computer readable medium and processor instructions contained on at least one computer readable medium, the processor instructions configured to be readable from the at least one computer readable medium by at least one processor and thereby cause the at least one processor to operate as to perform the steps of muting the wireless microphone unit responsive to a mute signal from a base station unit, transmitting, by the wireless microphone unit, compressed muted audio data, wherein the compressed muted audio data is compressed via a first compression scheme, determining, by the wireless microphone unit, whether an unmute signal has been received from the base station unit, responsive to a determination that the unmute signal has been received, unmuting the wireless microphone unit, discontinuing transmission of the compressed muted audio data and transmitting compressed audio data via a second compression scheme, wherein first transmitting step causes the wireless microphone unit to consume less power per unit of transmission time than the second transmitting step.

An article of manufacture for extending battery life of a wireless microphone unit, the article of manufacture includes at least one computer readable medium and processor instructions contained on at least one computer readable medium, the processor instructions configured to be readable from the at least one computer readable medium by at least one processor and thereby cause the at least one processor to operate as to perform the steps of muting the wireless microphone unit responsive to a mute signal from a base station unit, transmitting, by the wireless microphone unit, run-length-encoded muted audio data, determining, by the wireless microphone unit, whether an unmute signal has been received from the base station unit and responsive to a determination that the unmute signal has been received, unmuting the wireless microphone unit.

BRIEF DESCRIPTION OF THE DRAWINGS

A more complete understanding of the method and system of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1A:
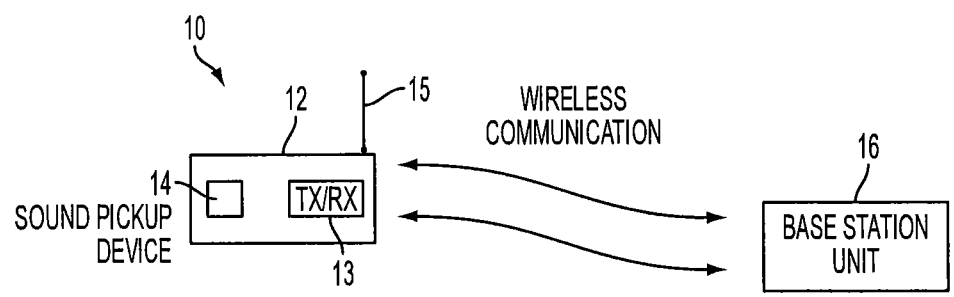
FIG. 1A is a block diagram illustrating communication between a wireless microphone unit and a base station unit.

FIG. 1A is a block diagram illustrating communication between a wireless microphone unit 12 and a base station unit 16. In a typical embodiment, the wireless microphone unit 12 includes a sound pickup device 14. In a typical embodiment, the sound pickup device 14 may be, for example, a microphone. The sound pickup device 14 is coupled to a transmit/receive (TX/RX) unit 13 and an antenna 15 is coupled to the TX/RX unit 13. In law-enforcement applications, according to a typical embodiment, the wireless microphone unit 12 may be attached to the person of a law-enforcement officer. The wireless microphone unit 12 is operable to allow activities of the officer and interactions of the officer with other individuals to be detected by the wireless microphone unit 12 and transmitted to another location for review and/or recording. In a typical arrangement, a vehicle of the law-enforcement officer includes the base station unit 16, which is operable to communicate wirelessly with the wireless microphone unit 12. In some systems, the base station unit 16 may be, for example, a digital video recorder (DVR), a hard drive, a VHS system, or some other recording device that may be used, among other things, to record data received by the base station unit 16 from the wireless microphone unit 12.

Some wireless microphone units are configured to change between a standby mode in which the wireless microphone unit does not transmit and an active mode in which the wireless microphone unit transmits. This solution represents an effort to take advantage of the general principle that a typical wireless microphone unit uses less power and, therefore, discharges its battery more slowly, when the wireless microphone unit is not transmitting relative to when the wireless microphone unit is transmitting.

However, in some circumstances, it is preferable that the wireless microphone unit not enter into a standby mode in which transmissions by the wireless microphone unit do not occur. In various embodiments, battery life of the wireless microphone unit 12 may be extended by incorporating data compression and muting of the sound pickup device 14 of the wireless microphone unit 12. In a typical embodiment, the sound pickup device 14 is muted via, for example, analog mute circuitry or digital mute circuitry. One type of data compression that may be used in various embodiments of the invention is run-length encoding (RLE). RLE is a form of data compression in which a run of data (i.e., a sequence in which the same data value occurs in many consecutive data elements) is stored as a single data value and count, rather than as the original run of data. RLE is typically more useful on data that contain many such runs, such as, for example, relatively simply graphic images such as icons, line drawings, and animations. RLE is typically not recommended for use with data that do not have many runs, as RLE could in such cases potentially double the size of the data being encoded.

In a typical embodiment, the wireless microphone unit 12 is responsive to a signal to mute the sound pickup device 14 of the wireless microphone unit 12. In response to such a signal, the wireless microphone unit 12 mutes the sound pickup device 14. As a result, no sound or signals representative thereof are detected by the TX/RX unit 13 or another component of the wireless microphone unit 12, resulting in one or more strings, for example, of zeros, which strings of zeros represent silence (i.e., no sound). In a typical embodiment, when the sound pickup device 14 has been muted, data transmitted by the wireless microphone unit 12 defaults to zero. RLE of the resultant very long string of zeros causes compression of the zeros into a relatively short string of data (e.g., two bytes) so that transmission of the detected silence is shorter in time and more energy efficient than if uncompressed data representing silence were not so compressed.

In a typical law-enforcement application, it is desirable to control muting of the wireless microphone unit 12 remotely from the base station unit 16 located, for example, in the law-enforcement vehicle. One way in which such remote muting can be implemented is responsive to recording of video, for example, onto a DVR, VHS, hard drive, or other storage media such as, for example, a solid state memory. In such an arrangement, events deemed not important enough to record video of are also considered not important enough to record audio of; therefore, in such embodiments, the wireless microphone unit 12 is muted responsive to a signal from the DVR or other video-recording device that is part of the base station in the law-enforcement vehicle and, during these times, power usage by the wireless microphone unit 12 is minimized, which causes battery life to be extended. However, muting of the sound pickup device 14 may be triggered by other events as desired.

Figure 1B:
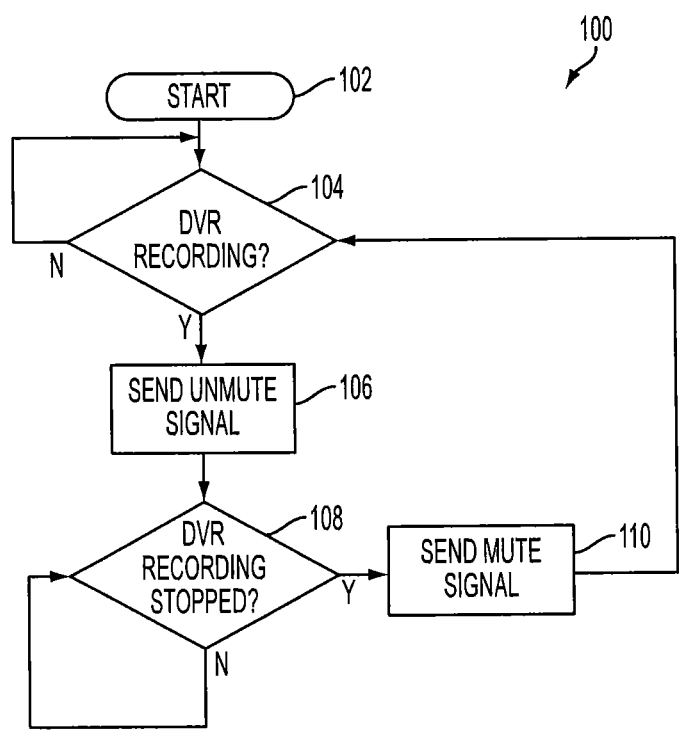
FIG. 1B is a flow diagram illustrating an exemplary process of mute/unmute control of a wireless microphone unit.

FIG. 1B is a flow diagram illustrating an exemplary process of mute/unmute control of the wireless microphone unit 12 by the base station unit 16, which, as discussed above, may include a DVR device. A process 100 begins at step 102. From step 102, execution proceeds to step 104. At step 104, a determination is made whether the DVR device of the base station unit 16 is recording video. Those having skill in the art will appreciate that principles of the invention may be applied whether a DVR-based recording device or other type of recording device is used and also may be applied regardless of whether the presence of video recording is the triggering event as described hereinbelow relative to the process 100.

Referring again to FIG. 1B, from step 104, if it is determined that the DVR device is recording, execution proceeds to step 106. At step 106, the base station unit 16 sends an unmute signal to the wireless microphone unit 12. From step 106, execution proceeds to step 108. If, however, at step 104, it is determined that the DVR device is not recording, execution returns to step 104.

At step 108, a determination is made whether the DVR device has stopped recording. If, at step 108, it is determined that the DVR device has not stopped recording, execution returns to step 108. However, if at step 108 it is determined that the DVR device has stopped recording, execution proceeds to step 110. At step 110, an unmute signal is sent to the wireless microphone unit 12. From step 110, execution proceeds to step 104. It is thus apparent that the base station unit 16 sends an unmute signal responsive to the DVR device recording video and sends a mute signal responsive to the DVR device recording no longer occurring.

Figure 2:
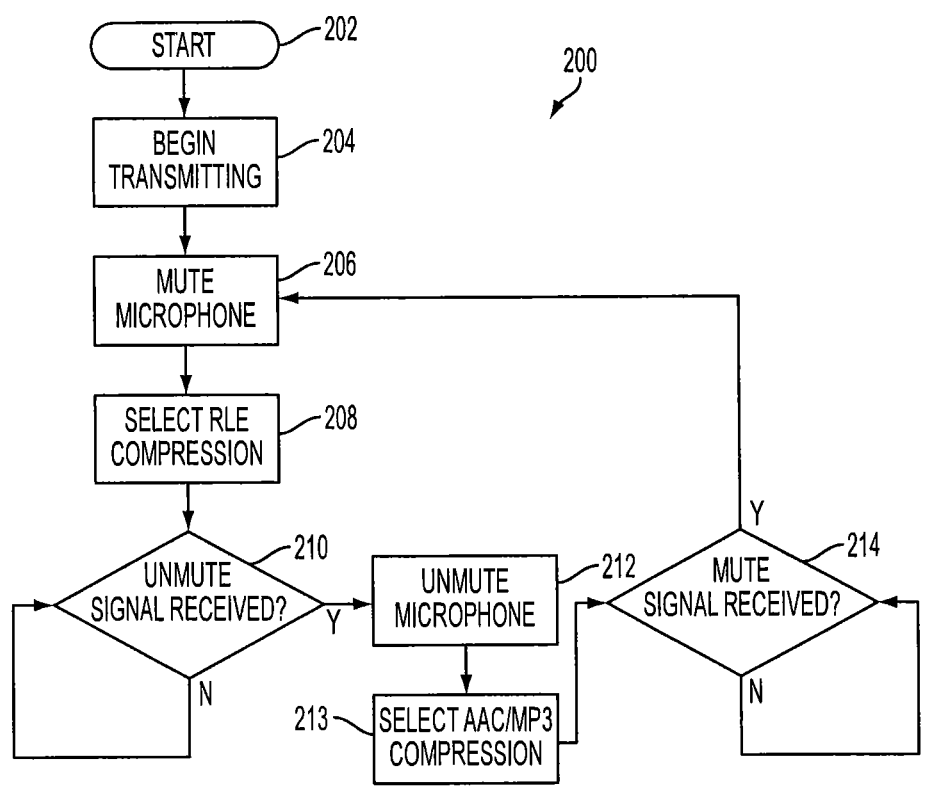
FIG. 2 is a flow diagram illustrating an exemplary process for operation of a wireless microphone unit.

FIG. 2 is a flow diagram illustrating an exemplary process for operation of the wireless microphone unit 12 responsive, for example, to mute and unmute signals such as those illustrated in FIG. 1A. A wireless-microphone-unit operation process 200 begins at step 202. From step 202, execution proceeds to step 204. At step 204, the wireless microphone unit 12 begins transmitting. From step 204, execution proceeds to step 206. At step 206, the wireless microphone unit 12 mutes the sound pickup device 14. From step 206, execution proceeds to step 208, at which step muted audio detected by the wireless microphone unit 12 (i.e., silence) is compressed using a first data-compression scheme. In a typical embodiment, the first data-compression scheme involves run-length encoding the muted audio by the wireless microphone unit 12. As noted above, run-length encoding of data representing silence results in extremely short transmissions and improved energy efficiency of the wireless microphone unit 12. In addition, run-length encoding of data representing silence typically results in less power consumption per unit of transmission time, resulting in extended battery life of the wireless microphone unit 12.

From step 208, execution proceeds to step 210. At step 210, a determination is made as to whether an unmute signal has been received. If, at step 210, no unmute signal has been received, execution returns to step 210. If, however, an unmute signal has been received at step 210, execution proceeds to step 212. At step 212, the sound pickup device 14 of the wireless microphone unit 12 is unmuted.

At step 213, data is compressed using a second data-compression scheme. In some embodiments, the second data-compression scheme may be utilized during at least part of the time that the sound pickup device 14 of the wireless microphone unit 12 is unmuted. The second data-compression scheme may include, for example, one or more of AAC, MP3, and DSS. Compression of data utilizing the second data-compression scheme typically causes the wireless microphone unit 12 to consume more power per unit of transmission time than when the first data-compression scheme disclosed above is used. In other embodiments, no data compression is used during the time that the wireless microphone unit 12 is unmuted.

From step 213, execution proceeds to step 214. At step 214, a determination is made whether a mute signal has been received. If a mute signal has not been received, execution returns to step 214. However, if a mute signal has been received, execution returns to step 206.

Those having skill in the art will appreciate that FIGS. 1A-2 describe just one of a number of potential implementation modes for the combination of run-length encoding and muting of the sound pickup device 14 of the wireless microphone unit 12 and that a number of different implementation modes may be utilized without departing from principles of the invention. In various embodiments of the invention, the wireless microphone unit 12 never enters into a standby mode in which the wireless microphone unit 12 is powered up and operational but not transmitting audio (i.e., sounds or silence). In another operational mode from the one illustrated in FIGS. 1A-2, for example, the wireless microphone unit 12 may monitor the base station unit 16 to determine whether a video recording or some other event is occurring and mute or unmute responsive thereto.

Figure 3:
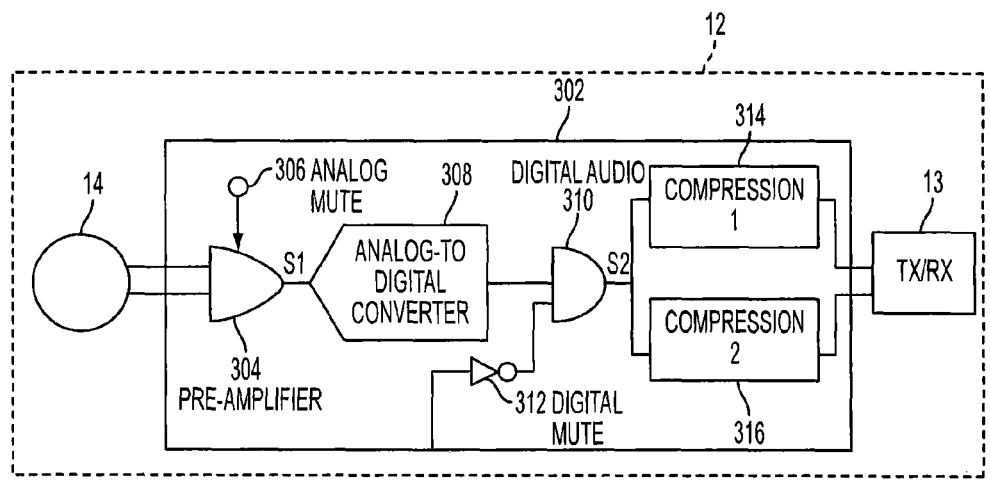
FIG. 3 is a detailed block diagram of an exemplary wireless microphone unit.

FIG. 3 is a detailed block diagram of the wireless microphone unit 12. The wireless microphone unit 12 includes the sound pickup device 14. In a typical embodiment, the sound pickup device 14 may be, for example, a microphone. The sound pickup device 14 is coupled to the transmit/receive (TX/RX) unit 13 via circuitry 302. The wireless microphone unit 12 is operable to convert sound to digital data and deliver the digital data to the TX/RX unit 13. The circuitry 302 includes a pre-amplifier 304, analog mute circuitry 306, an analog-to-digital converter 308, an AND gate 310, digital mute circuitry 312 comprising a NOR gate, a first compression block 314, and a second compression block 316.

The pre-amplifier 304 is operable to amplify an analog sound signal from the sound pickup device 14 to obtain an amplified analog sound signal $S_1$ that is input to the analog-to-digital converter 308. The analog-to-digital converter 308 is operable to convert the analog sound signal $S_1$ to a digital signal $S_2$. The digital signal $S_2$ is input to either or both of the first encoding block 314 and the second encoding block 316. It will be apparent that the encoding performed by the blocks 314 and 316 may be accomplished by hardware or software. In various embodiments, battery life of the wireless microphone unit 12 may be extended by incorporating data compression and muting of the sound pickup device 14 of the wireless microphone unit 12.

In a typical embodiment, the sound pickup device 14 is muted via, for example, the analog mute circuitry 306 and/or the digital mute circuitry 312. Audio detected by the wireless microphone unit 12 that has been muted (i.e., silence) is, for example, compressed using a first data-compression scheme by the first encoding block 314 and/or the second encoding block 316. In a typical embodiment, the first data-compression scheme involves run-length encoding the muted audio. As noted above, run-length encoding of data representing silence results in extremely short transmissions and improved energy efficiency of the wireless microphone unit 12. In addition, run-length encoding of data representing silence typically results in less power consumption which results in extended battery life of the wireless microphone unit 12. Those having skill in the art will appreciate that FIG. 3 illustrates an exemplary implementation of circuitry 302 coupling the sound pickup device 14 to the transmit/receive (TX/RX). It will be understood that the circuitry 302 is not limited to the embodiment disclosed, but is capable of numerous additions, rearrangements, modifications and substitutions without departing from the spirit of the invention as set forth herein.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of extending battery life of a wireless microphone unit, the method comprising:
   muting the wireless microphone unit responsive to a mute signal from a base station unit;
   transmitting, by the wireless microphone unit, run-length-encoded muted audio data;
   determining, by the wireless microphone unit, whether an unmute signal has been received from the base station unit;
   responsive to a determination that the unmute signal has been received, unmuting the wireless microphone unit; and
   wherein the base station unit comprises a recording device configured to record the run-length-encoded muted audio data transmitted by the wireless microphone unit.

2. The method of claim 1, wherein, responsive to the muting step, the muted audio data defaults to zero.

3. The method of claim 1, wherein the run-length-encoded muted audio data comprises at least one string of zeros compressed into a short string of data.

4. The method of claim 3, wherein the at least one string of zeros represents silence.

5. The method of claim 1, wherein, responsive to the muting step, audio data representing silence is received by a transmit/receive unit of the wireless microphone unit.

6. The method according to claim 1, wherein, responsive to the unmuting step, the wireless microphone unit performs the following steps:
   discontinuing transmission of the run-length-encoded muted audio data; and
   transmitting compressed audio data utilizing at least one of Digital Speech Standard (DSS), Advanced Audio Coding (AAC), and MP3.

7. The method according to claim 1, wherein, responsive to the unmuting step, the wireless microphone unit performs the following steps:
   discontinuing transmission of the run-length-encoded muted audio data; and
   transmitting uncompressed audio data.

8. The method of claim 1, wherein the muting step comprises operably disconnecting a sound pickup device of the wireless microphone unit from a transmit/receive unit of the wireless microphone unit.

9. The method of claim 1, wherein the muting step comprises muting the wireless microphone unit utilizing analog mute circuitry.

10. The method of claim 1, wherein the muting step comprises muting the wireless microphone unit utilizing digital mute circuitry.

11. The method of any of claim 1, wherein the steps are performed in the order listed.

12. An article of manufacture for extending battery life of a wireless microphone unit, the article of manufacture comprising:
   at least one non-transitory computer readable medium;
   processor instructions contained on at least one computer readable medium, the processor instructions configured to be readable from the at least one computer readable medium by at least one processor and thereby cause the at least one processor to operate as to perform the following steps:
   muting the wireless microphone unit responsive to a mute signal from a base station unit;
   transmitting, by the wireless microphone unit, run-length-encoded muted audio data;
   determining, by the wireless microphone unit, whether an unmute signal has been received from the base station unit;
   responsive to a determination that the unmute signal has been received, unmuting the wireless microphone unit; and
   wherein the base station unit comprises a recording device configured to record the run-length-encoded muted audio data transmitted by the wireless microphone unit.

* * * * *